March 28, 1939.    G. F. ENDICOTT    2,152,376
HAND BRAKE
Filed Feb. 1, 1936
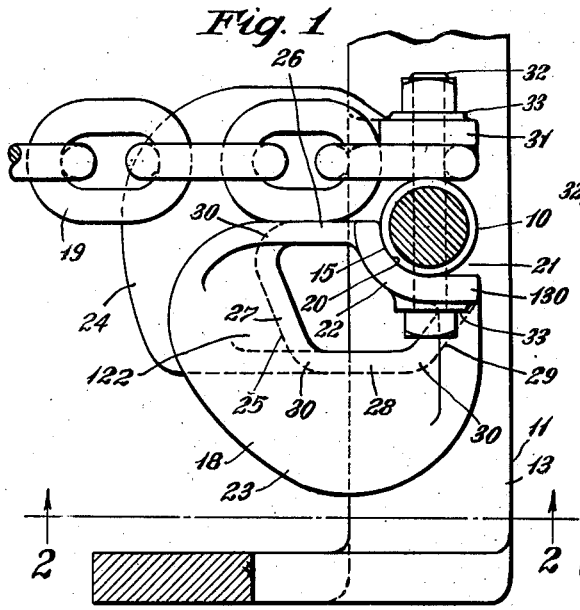
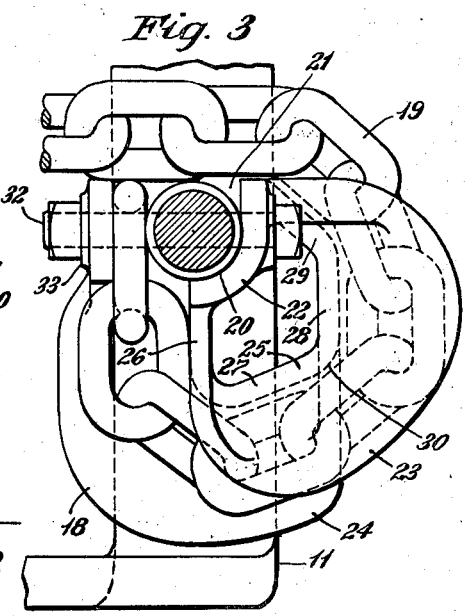
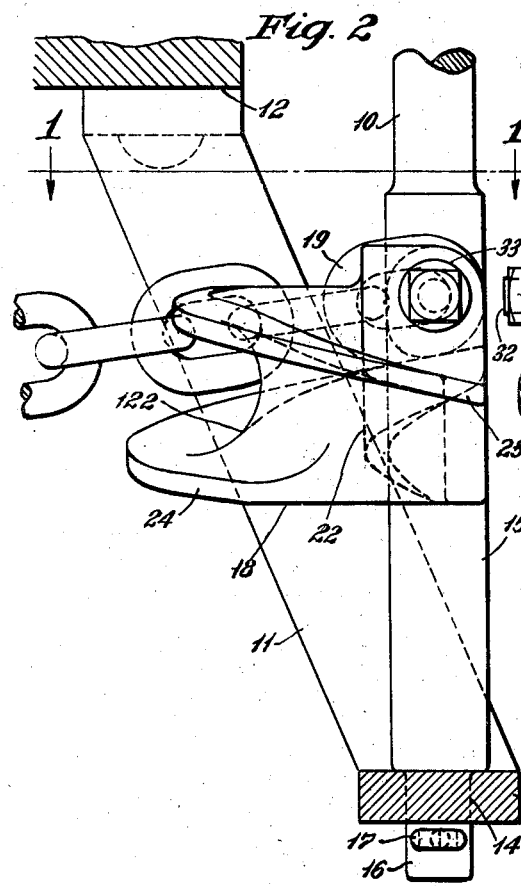
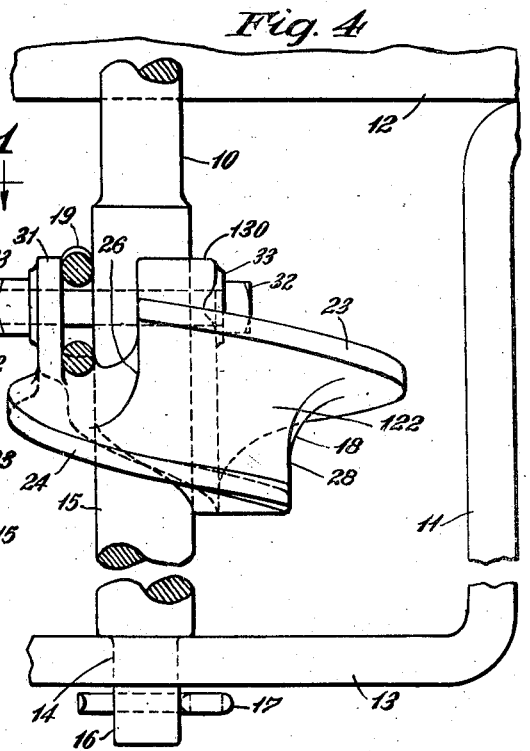
Inventor
George F. Endicott
By Henry Fuchs Atty.

Patented Mar. 28, 1939

2,152,376

UNITED STATES PATENT OFFICE 2,152,376

HAND BRAKE

George F. Endicott, St. Paul, Minn., assignor to W. H. Miner, Inc., Chicago, Ill., a corporation of Delaware Application February 1, 1936, Serial No. 61,972

10 Claims. (Cl. 254—149)

This invention relates to improvements in hand brakes.

One object of the invention is to provide in a hand brake mechanism for railway cars, including a rotary member on which the flexible element or chain leading to the brake mechanism proper of the car is wound, simple and efficient means fixed to and rotatable with said rotary member for quickly taking up the chain during the initial rotation of said member.

Another object of the invention is to provide a quick take-up means of the character specified in the preceding paragraph which may be easily attached to the usual winding element of a hand brake mechanism without disturbing or disassembling the parts of said mechanism.

A still further object of the invention is to provide a quick take-up means for a hand brake mechanism, comprising a member mounted on the rotary chain winding element of the brake mechanism and having a projecting or eccentric portion upon which the chain is wound during the initial application of the brakes to effect rapid take-up of said chain and quickly bring the brake shoes of the brake mechanism into engagement with the car wheels.

Yet another object of the invention is to provide a quick take-up mechanism of the character set forth in the preceding paragraph wherein the quick take-up mechanism or member is provided with a winding surface or guideway for the chain of gradually decreasing radius which directs the chain onto the winding element to be wound on the latter during the final tightening operation of the brake mechanism.

A further object of the invention is to provide a quick take-up member which may be readily attached to the rotary chain winding element of a brake mechanism, together with means for securing said member in position on said winding element, wherein the securing element also serves to anchor the chain to the winding element.

Other objects of the invention will more clearly appear from the description and claims hereinafter following.

In the drawing forming a part of this specification, Figure 1 is a horizontal, sectional view, partly broken away, through the vertical staff and the supporting bracket of a hand brake mechanism of a railway car, illustrating my improvements in connection therewith, the section corresponding substantially to the line 1—1 of Figure 2. Figure 2 is a vertical, sectional view, corresponding substantially to the line 2—2 of Figure 1. Figure 3 is a view, similar to Figure 1 but showing the parts in a different position. Figure 4 is a broken, elevational view of Figure 2, looking from left to right in said last named figure, the end link of the brake chain being shown in vertical section.

In said drawing, my improvements are shown as embodied in a vertical staff type of hand brake mechanism, the lower end portion of the brake staff being indicated by 10. The vertical brake staff 10 is mounted on the end of the car and is provided at its upper end with the usual operating hand wheel (not shown) for rotating the same. As is common in this type of brake mechanism, the staff is locked against rotation in unwinding direction in a well-known manner by the usual locking dog cooperating with ratchet means on the staff, the dog ratcheting over said ratchet means when the staff is rotated in chain winding direction and being manually disengageable from the ratchet means to permit free rotation of the staff in quickly releasing the brakes. The lower end of the staff 10 is rotatably mounted in a supporting bracket 11 depending from the bottom of the car, as shown in Figures 2 and 4, the bottom portion of the car being indicated by 12 in said figures. As illustrated, the bracket 11 is in the form of a stirrup having a horizontal section 13 provided with a bearing opening 14 through which the lower end portion of the staff 10 projects. The staff 10 has an enlarged cylindrical portion 15 adjacent to the lower end thereof and the lower extremity of said staff is of reduced diameter, as indicated at 16. The reduced portion 16 is journaled in the opening 14 of the section 13 of the stirrup 11 and extends through the latter. A cotter pin 17 engaged through the lower extremity of the staff 10 prevents upward displacement of the same.

My improved quick take-up means proper, which is in the form of a casting 18, is secured to the staff 10 and is mounted on the enlarged portion 15 thereof. As will be understood by those skilled in the art, the brake chain, which is indicated by 19, is connected to the brake mechanism of the car in the usual manner to properly operate the brake shoes. Although my improved quick take-up means is herein illustrated as applied to the winding element of a brake mechanism of the vertical staff type, it will be evident that the invention is not limited to this particular design of brakes, but may be employed equally well with any other type of brake mechanism having a rotary chain winding element.

The casting 18 has a vertical opening 20 therethrough in the form of a relatively wide slot which is open at one side, as indicated at 21. The slot 20 has a curved vertical inner wall 22 extending through an arc of substantially 180 degrees and snugly fitting about the enlarged portion 15 of the shaft 10. The side walls of the slot 20 form, in effect, jaw members which embrace the portion 15 of the brake staff. As will be evident, the opening 21 of the slot 20 is of sufficient size to accommodate the enlarged portion 15 of the staff 10 so that the casting 18 may be readily engaged over said enlarged portion of the staff in mounting the casting thereon.

The casting 18 has a chain guiding and winding portion 122 thereon which is eccentric to the axis of rotation of the staff 10, said eccentric portion being to one side of said staff, as clearly shown in Figures 1 and 2. The chain guiding portion 122 is defined by spaced top and bottom flanges 23 and 24 and a connecting wall 25 between said flanges. The wall 25 is preferably curved in a vertical direction, as shown in Figures 2 and 4, said wall 25 merging with the inner portions of the flanges 23 and 24. The wall 25 presents faces 26, 27, 28, and 29, the central portion of the faces 27, 28, and 29 being disposed substantially tangent to circles concentric with the cylindrical portion 15 of the staff 10. The connecting portions between the faces 26, 27, 28, and 29 are rounded off, as indicated at 30—30. The central portion of the face 26 is substantially radial to the axis of rotation of the staff 10. The face 26 merges at its outer end with the face 27. The face 27 is spaced a greater distance from the staff 10 than the face 28, with which said face 27 merges. The face 29, with which the face 28 merges, terminates closely adjacent to the surface of the cylindrical portion 15 of the staff 10 to properly direct the chain to be wound on said staff. The top guide flange 23 projects from and is substantially coextensive with the faces 27, 28, and 29, as shown most clearly in Figure 1, while the bottom flange projects from and is substantially coextensive with the faces 26 and 27.

At opposite sides of the opening or slot 20, the casting 18 is provided with upstanding portions 130 and 31, the portion 130 being in the form of a flange and the portion 31 being in the form of a lug. The flange 130 forms a continuation of the wall 26 and has the inner faces thereof of the same contour as the corresponding wall portion of the slot 20 and is in vertical alignment therewith. As shown most clearly in Figure 1, the curved portion of the inner face of the flange 130, which corresponds to the curved section of the wall 22 of the slot 20 and is in alignment therewith, embraces the portion 15 of the staff through an arc of substantially 90 degrees. The lug 31, which is opposed to the flange 130, is spaced outwardly from the corresponding side wall portion of the slot 20 a distance substantially equal to the thickness of the end link of the brake chain 19, so that said end link may be accommodated between the section 15 of the staff 10 and said lug. The opening between the lug 31 and the section 15 of the staff is preferably of such a size that the end link of the chain is snugly clamped between the staff and said lug.

The casting 18 is secured to the upper portion of the enlarged section 15 of the staff 10 by a bolt 32, which extends through aligned openings in the staff 10, the flange 30, and the lug 31. The bolt 32 also extends through the opening of the end link of the chain 19, as shown most clearly in Figures 1, 3, and 4, thereby also anchoring the chain to the brake staff. The casting 18 is reenforced by bosses 33—33 at the bolt openings to add strength to the parts and also provide seats for the head and nut of the bolt.

In applying my improved quick take-up means to a brake staff, the casting 18 is first engaged over the portion 15 of the staff and the bolt openings thereof brought into alignment with the bolt opening of the staff. The brake chain 19 is then placed in the proper position with the opening of the end link thereof in alignment with the bolt openings of the staff 10 and casting 18, and the parts are secured to the staff by the bolt 32 by engaging the latter through the openings of the staff 10, the casting 18, and the end link of the chain 19. As will be evident, by providing a jaw-like attaching portion for the quick take-up casting 18, the latter may be readily applied to the staff 10 without disturbing the brake mechanism or requiring the removal of any of the parts thereof, it being necessary merely to engage the jaw portion of the casting over the staff to place the same in position thereon.

In the operation of applying the brakes, the staff 10 is rotated in a clockwise direction, as viewed in Figure 1, thereby also effecting rotation of the quick take-up member 18 from the position shown in Figure 1 toward that shown in Figure 3, thereby winding the chain on the eccentric portion 122 of the member 18 and rapidly taking up the slack in the chain 19. During this action, the chain is folded against the guide faces 27, 28, and 29 of the member 18 while being guided between the flanges 23 and 24. The chain is thus directed into engagement with the winding section 15 of the staff 10 during the further rotation of said staff. While the staff is thus being further rotated in chain winding direction, the chain is wound about the section 15 of the staff below said member 18, thereby effecting final application of the brakes with greatly increased power.

From the preceding description taken in connection with the drawing, it will be evident that I have provided simple and efficient take-up means for hand brakes which may be readily applied and secured to the winding element of the mechanism. As will be further evident, I have in addition provided an arrangement in which the take-up means or device, together with the brake chain, may be secured to the winding element of the brakes in one operation, and in which a single locking element serves to secure both the take-up device and the brake chain to the brake staff, thereby not only greatly reducing the labor necessary in assembling and applying the parts but also reducing to a minimum the number of parts required.

I have herein shown and described what I now consider the preferred manner of carrying out my invention, but the same is merely illustrative and I contemplate all changes and modifications that come within the scope of the claims appended hereto.

I claim:

1. In a hand brake mechanism, the combination with a rotary winding element having a winding surface concentric with the axis of rotation thereof; of a quick take-up member on said element having a winding portion projecting beyond the winding surface of said element, said quick take-up member having a vertical opening, said opening extending entirely through one side of said member to permit entrance of said element sidewise into said opening; and means for securing said member to said element.

2. In a hand brake mechanism, the combination with a rotary chain winding element having a winding surface concentric with the axis of rotation thereof and a chain leading to the brake mechanism proper of the car; of a quick take-up member mounted on said element having a winding surface having a portion thereof projecting outwardly of the winding surface of said element, said take-up member having a laterally inwardly extending opening defined by laterally spaced upstanding portions at opposite sides of said element in embracing relation to the latter; and means for securing the end link of the chain and said member to said element, comprising a bolt extending through said element, the end link of the chain, and said upstanding portions.

3. In a hand brake mechanism, the combination with a rotary chain winding element having a winding surface concentric with the axis of rotation thereof and a brake chain leading to the brake mechanism proper of the car; of an eccentric quick take-up member mounted on said element; an upstanding lug on said member at one side of said element and spaced therefrom a distance to accommodate the end link of the chain therebetween; and securing means extending through said element, end link, and lug for securing said member and chain to said element.

4. In a hand brake mechanism, the combination with a rotary chain winding element having a winding surface concentric with the axis of rotation thereof and a brake chain leading to the brake mechanism proper of the car; of an eccentric quick take-up member mounted on said element, said member having a portion embracing said element; an upstanding lug on said member spaced from said element and closely embracing the end link of the chain between said lug and element; and a clamping bolt extending through said first named portion of said member, said link, and said lug for securing said member and chain to said element.

5. In a hand brake mechanism, the combination with a rotary winding element having a winding surface concentric with the axis of rotation thereof and a chain leading to the brake mechanism proper of the car; of an eccentric quick take-up member mounted on said element, said eccentric take-up member having a chain guide thereon having a portion thereof radial to the axis of rotation of said element; and means for securing said member and chain to said element and clamping the end link of the chain to said element adjacent the inner end of said radial portion of said chain guide.

6. In a hand brake mechanism, the combination with a rotary winding element having a winding surface concentric with the axis of rotation thereof and a chain leading to the brake mechanism proper of the car; of an eccentric quick take-up member mounted on said element, said eccentric member having a chain guide thereon defined by top and bottom flanges and a guide face between said flanges, said guide face having a portion at one end thereof radial to the axis of rotation of said element and a part at the other end thereof substantially merging with the outer surface of said element; and means for securing the end link of said chain to said element adjacent the first named end of said chain guide face.

7. In a hand brake mechanism, the combination with a rotary, cylindrical chain winding element and a chain leading to the brake mechanism proper of the car; of means for securing the end link of the chain to one side of said cylindrical element, said chain and end link thereof extending tangentially to the cylindrical surface of said element; and an eccentric take-up member mounted on said element having a chain guide thereon having the leading end portion thereof radial to the axis of rotation of said element and parallel to said end link of the chain.

8. In a hand brake mechanism, the combination with a rotary chain winding shaft; of a separate quick take-up member mounted on said shaft, said take-up member having a winding surface projecting from said shaft and eccentric to the axis of rotation of said shaft, said member including a laterally opening jaw portion embracing said shaft on opposite sides; and fastening means securing said member to said shaft.

9. In a hand brake mechanism, the combination with a rotary chain winding shaft; of a separate winding member mounted on said shaft, said member having a winding surface thereon projecting from said shaft and eccentric to the axis of rotation of said shaft, said member including a laterally open jaw having spaced jaw members embracing said shaft on opposite sides; and securing means extending through said winding member and shaft.

10. In a hand brake mechanism, the combination with a rotary chain winding shaft; of a separate winding element having a winding surface projecting from said shaft and eccentric to the axis of rotation of said shaft, said element having a laterally opening jaw comprising spaced jaw members embracing said shaft; and a securing device extending through said jaw members and element for fixing said element to said shaft.

GEORGE F. ENDICOTT.